(12) United States Patent
Filus et al.

(10) Patent No.: US 6,284,980 B1
(45) Date of Patent: Sep. 4, 2001

(54) CABLE ORGANIZER WITH CONDUCTOR TERMINATION ARRAY

(75) Inventors: Wayne S. Filus, Lebanon; Theodore A. Conorich, Parsippany Township, Morris County; William J. Ivan, Woodbridge, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/329,438

(22) Filed: Jun. 10, 1999

Related U.S. Application Data

(60) Provisional application No. 60/129,644, filed on Apr. 16, 1999.

(51) Int. Cl.[7] ........................................ H01B 7/00
(52) U.S. Cl. ............................................. 174/135
(58) Field of Search ...................... 174/135, 35 R, 174/261, 262

(56) References Cited

U.S. PATENT DOCUMENTS 5,179,618 * 1/1993 Anton ................................ 174/35 R
5,387,764 * 2/1995 Blom et al. ......................... 174/261
5,718,604   2/1998 Conorich et al. .

OTHER PUBLICATIONS

Product Application Guide, *110 Connector Systems for Premises Application*, Issue 4, Apr. 1994.

* cited by examiner

*Primary Examiner*—Shawn Riley
(74) *Attorney, Agent, or Firm*—Gibbons, Del Deo, Dolan, Griffinger & Vecchione

(57) ABSTRACT

A wiring block for telecommunications and data management has a combination cable organizer for routing cabling and conductor termination array for wiring connections. A conductor termination array is mounted on the upper edge of a plate. Guide walls extend across the plate front surface, defining channels for directing the cable conductors across the plate front surface for retaining the cable conductors. The cable conductors are sheathed up to the termination array.

11 Claims, 5 Drawing Sheets

CABLE ORGANIZER WITH CONDUCTOR TERMINATION ARRAY

CROSS-REFERENCE TO RELATED APPLICATIONS

This application claims the benefit of United States Provisional Application Serial No. 60/129,644, filed on Apr. 16, 1999. This application is related to copending application Ser. No. 09/329,573 entitled "Twenty Eight Pair Cabling System" filed on Jun. 10, 1999, copending application Ser. No. 09/330,120 entitled "Cable Cover" filed on Jun. 10, 1999, and copending application Ser. No. 09/329,444 entitled "Printed Wiring Board Cable Cover" filed on Jun. 10, 1999.

FIELD OF THE INVENTION

This invention relates to the field of telecommunications, and more particularly to connectors for use in telecommunications system cabling.

BACKGROUND OF THE INVENTION

The telecommunications and data management industries utilize connective hardware for general building wiring, premises distribution systems, local area networks, and other network applications. The connective hardware known as the 110 Connector Systems has become a standard of the industry because of the reliable gas-tight connection provided by the 110 Insulation Displacement Connector. The miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector System consists of field-wired cable termination apparatus that is used to organize and administer cable and wiring installations. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects provide efficient and convenient routing and rerouting of common equipment circuits to various parts of a building or campus.

The 110 Connector Systems enable cable and wiring installations to be handled by technical or non-technical end user personnel. Line moves and rearrangement for the cabling terminated at a cross connect can be performed with patchcords (plug-ended jumpers) or cross-connect wire. The patchcords are used where the highest system integrity is required.

Referring now to FIGS. 1,2, and 3, the prior art 110 Connector System 10 was designed to have its connector ports 15 arranged in horizontal rows in uniformly spaced conductor termination arrays (index strips). FIG. 1 shows four rows of index strips 14 mounted in a typical wiring block 12. The spaces between these index strips become troughs, and are alternately dedicated as either cable routing troughs 16 or cross-connect wire routing troughs 18.

Unsheathed cable conductors 20 are routed through the cable troughs 16 to their appropriate termination ports in the index strips 14. All cable sheaths stop at the entrance to the cable troughs 16. Each cable trough 16 feeds conductors to the two index strips that form its sides.

Connecting blocks 22, each containing several contact elements 24 in pairs, are placed over the index strips 14 and make electrical connections to the cable conductors 20. These connecting blocks 22 also form the side walls of the troughs 16 and 18. A designation strip 26 is placed within the cable trough 16, near the top of the connecting blocks 22. This strip 26 extends the full length of the cable trough 16, covering the conductors from cables 20, and allows the cable connector ports 15 to be visibly labeled as an indication of where the other end of the cables are attached. A pair of row marking surfaces 27 are provided to label each row.

Cross-connect wire (not shown) or patch cords 28 are terminated in the ports 25 on the top of the connecting blocks 22. Cross-connect wires, when used, are routed to their appropriate ports 24 through the cross-connect troughs 18 between the cable troughs 16. The connecting blocks 22 form the separator between cable conductors 20 and cross-connect conductors. When patch cords 28 are used, the cross-connect troughs 18 remain empty.

The 110 patchcords 28 are available now in two versions. The old version is a forward-engaging patchcord 28 that uses a forward-engaging plug 30 as shown in FIG. 1. The patchcord 28 projects outward from the connecting block 22, is routed through ducts 32, backboards 34, and troughs 36 to another connecting block 22, as shown in FIG. 3.

The new version patchcord uses a reverse-engaging plug. The new patchcord is further described in U.S. Pat. No. 5,718,604 entitled Patch Cord Connection System issued on Feb. 17, 1998 and is incorporated herein by reference.

SUMMARY OF THE INVENTION

In accordance with the present invention, there is provided a cable organizer, for use in connection with cable conductors. The cable organizer comprises a plate having front and rear surfaces. The plate surfaces extend between opposite upper and lower edges, and between first and second ends. A conductor termination array is mounted on the plate upper edge. Directing means is provided for directing the cable conductors across the plate front surface toward the termination array.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 6:
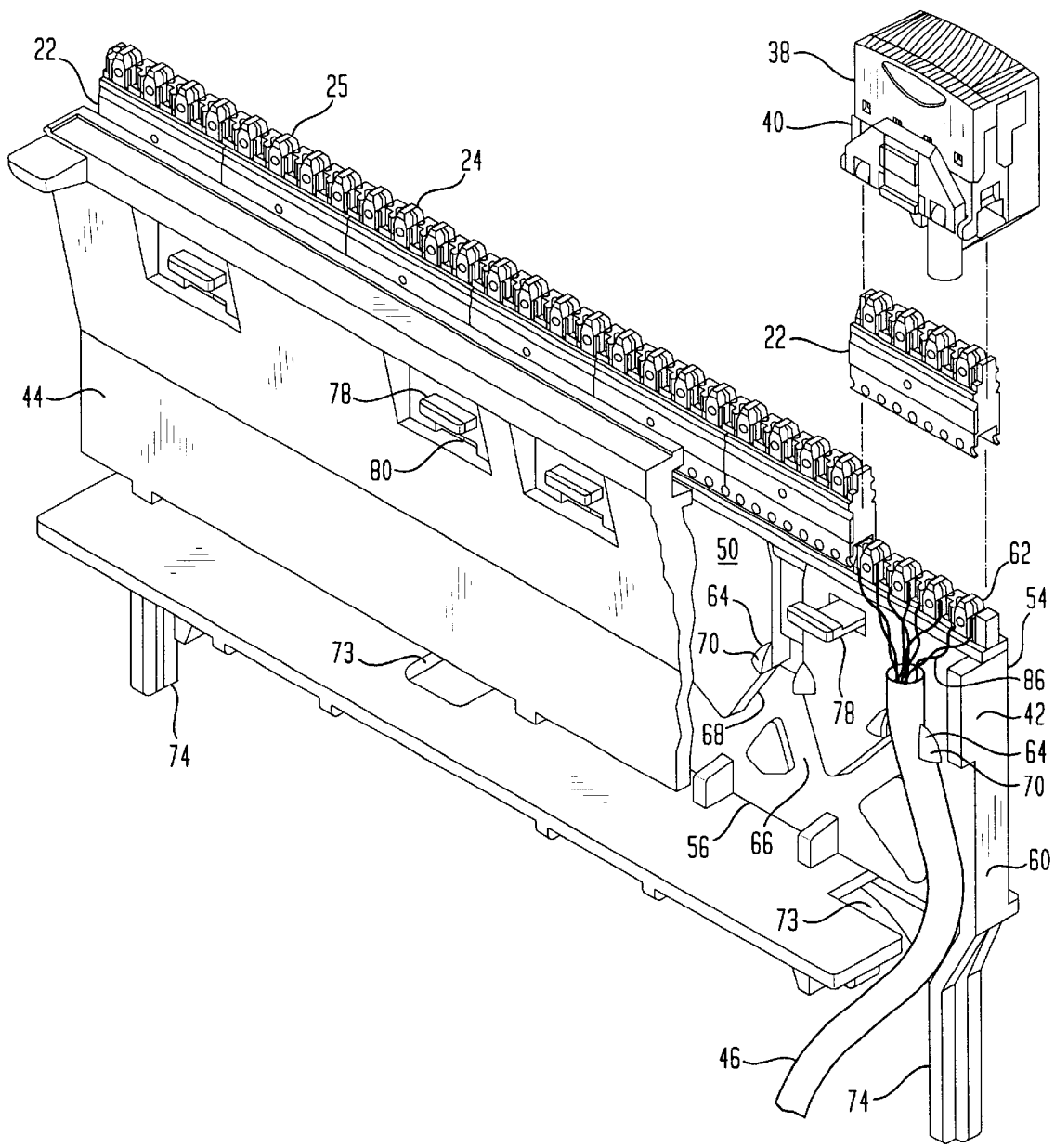
FIG. 6 is a perspective view of the cable organizer of FIG. 4, showing a cable cover partially cut-away, conductor termination array, connecting blocks, and patchcord plug in a partially exploded assembly.

The new version reverse-engaging patchcord 38 uses a reverse-engaging plug 40 as shown in FIG. 6. The new patchcord 38 projects inward. Every trough potentially carries all three types of conductor: patchcords 38, conductors from cables 20, and cross-connect conductors. Consequently, the troughs are crowded, making the cross-connect conductors and patch cords difficult to trace. The crowding of unsheathed cable conductors can result in cross-talk and other electrical problems, and the new patchcord 38 can snag on wiring while being pulled out. In order to partly address these problems, the wiring block has elevated index strips set wider apart to enlarge the troughs.

Figure 1:
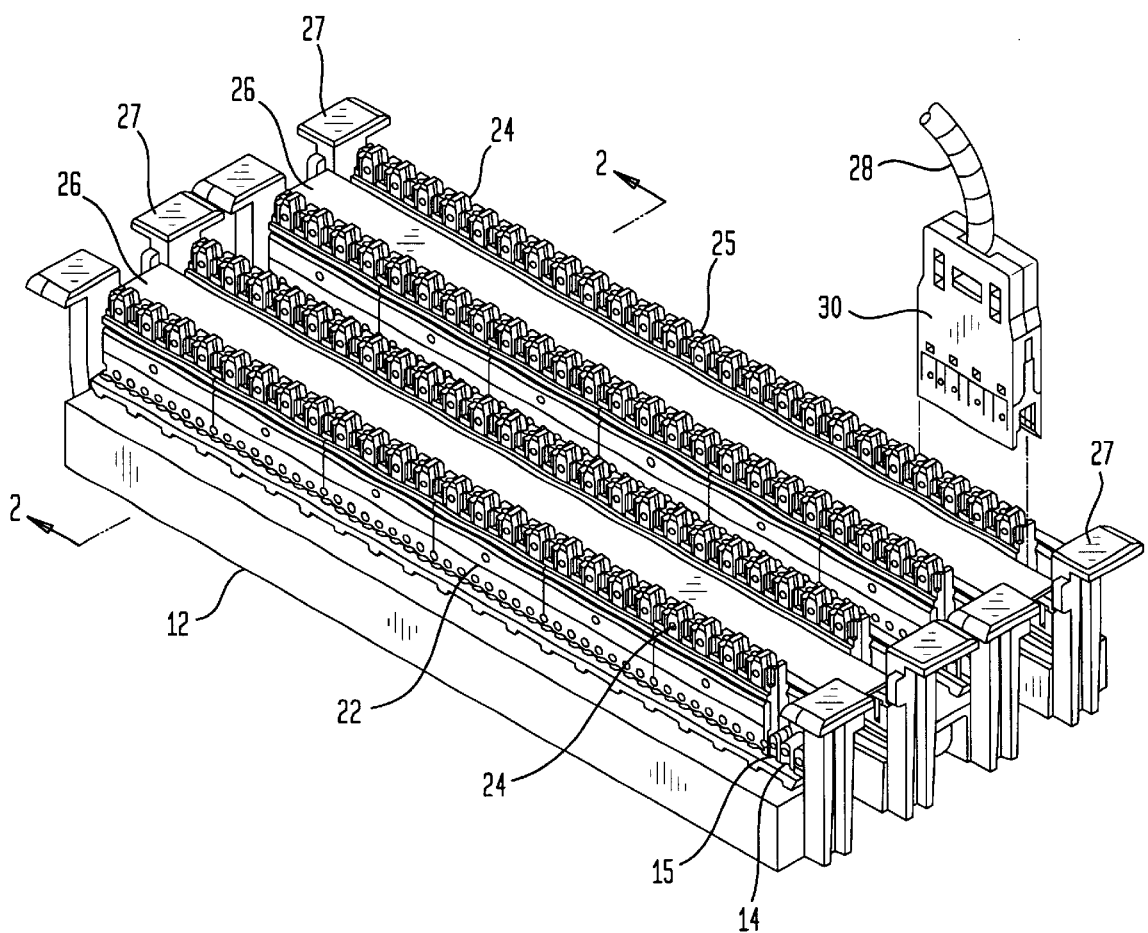
FIG. 1 is a perspective view of a prior art wiring block, including connection blocks and a forward-engaging patchcord plug.
Figure 2:
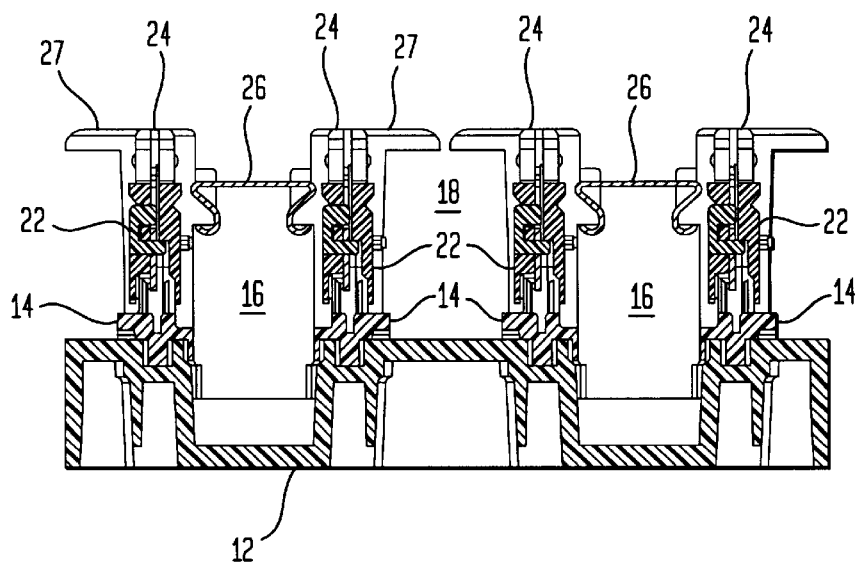
FIG. 2 is a cross-sectional view of the prior art wiring block of FIG. 1, taken along lines 2—2 of FIG. 1.
Figure 3:
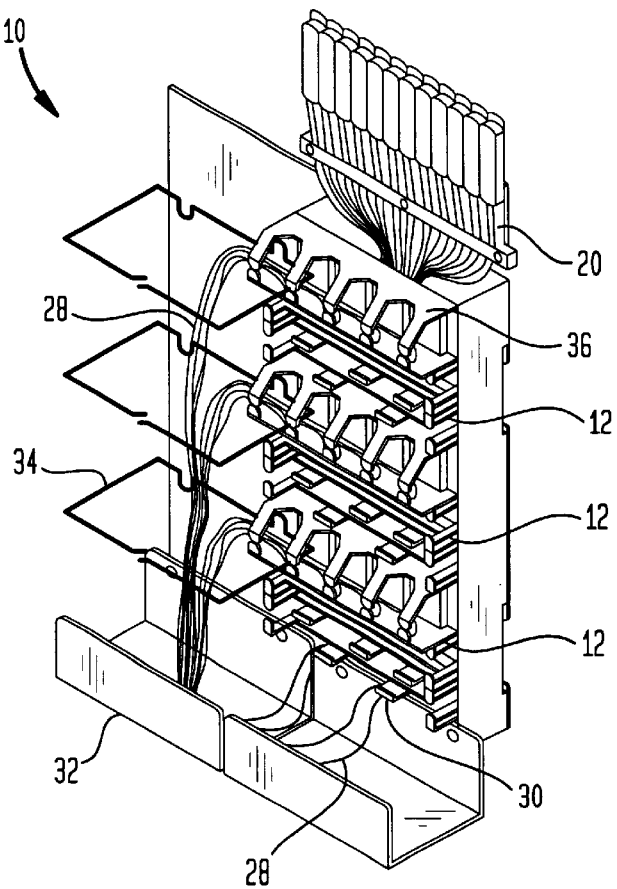
FIG. 3 is a perspective view of a prior art 110 Connector System, showing the prior art wiring block, patchcords and troughs.
Figure 4:
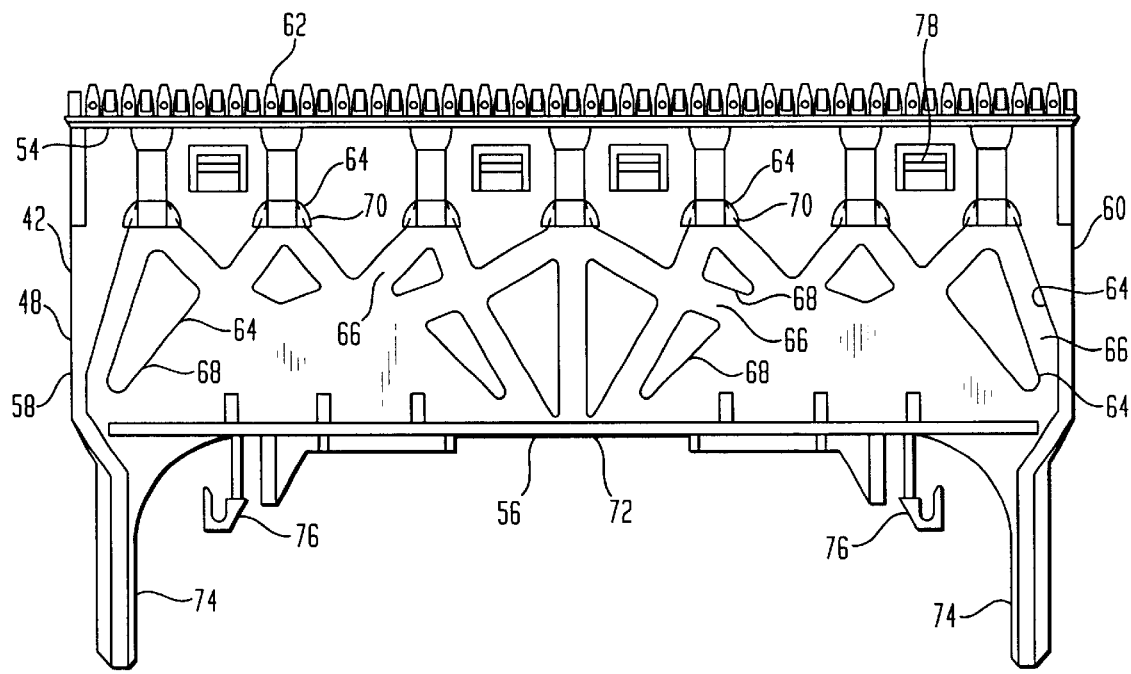
FIG. 4 is a front elevational view of a cable organizer and conductor termination array constructed in accordance with the invention.
Figure 5:
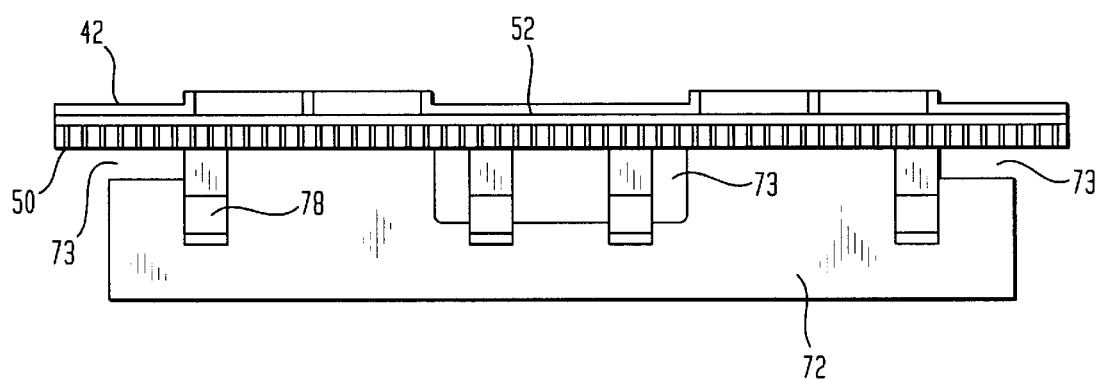
FIG. 5 is a top plan view of the cable organizer of FIG. 4.

Referring now to the drawing, and especially to FIGS. 4, 5, and 6, a cable organizer is shown at 42. The cable organizer 42 is provided in connection with a cable cover 44, cables 46, and connecting blocks 22. The cable organizer 42 comprises a plate 48 having front 50 and rear 52 surfaces. The surfaces 50 and 52 extend between opposite upper 54 and lower 56 edges, and between first 58 and second 60 ends. A conductor termination array 62 is mounted on the plate upper edge 54 and extends between the first 58 and second 60 ends.

A plurality of guide elements 64 are disposed transversely to the plate front surface 50. The guide elements 64 define channels 66 for receiving and directing the cables 46 across the plate front surface 50 toward the termination array 62. The guide elements 64 can take a variety of forms. One form is a plurality of walls 68 extending across the plate front surface 50. Another form is a plurality of hooks 70 projecting outward from the plate front surface 50, for retaining the cables 46. The hooks 70 project over the channels 66 at a bend in the channels 66 so that the cables 46 will not slip out. The walls 68 and hooks 70 can be used simultaneously, as shown in FIGS. 4 and 6.

A shelf 72 projects outward from the plate lower edge 56 to support wiring. The shelf 72 has slots 73 therethrough adjacent the plate front surface 50 to pass the cable conductors 46 through the shelf 72.

Mounting means is provided for releasably mounting and stabilizing the cable organizer 42 on a support base (not shown). Typically, the mounting means comprises at least one, and preferably two arms 74 attached to the plate lower edge 56 and extending away therefrom. The arms 74 insert into corresponding holes in the support base to support and hold upright the cable organizer 42. The mounting means also includes at least one, and preferably two mounting latches 76 attached to the lower surface of shelf 72 for engagement with and releasable locking to the support base.

Retaining means is provided for releasably retaining the cable cover 44 on the cable organizer 42. A resilient cover latch 78 projects outward from the plate 48 for engaging a corresponding hole 80 in the cable cover 44.

Figure 7:
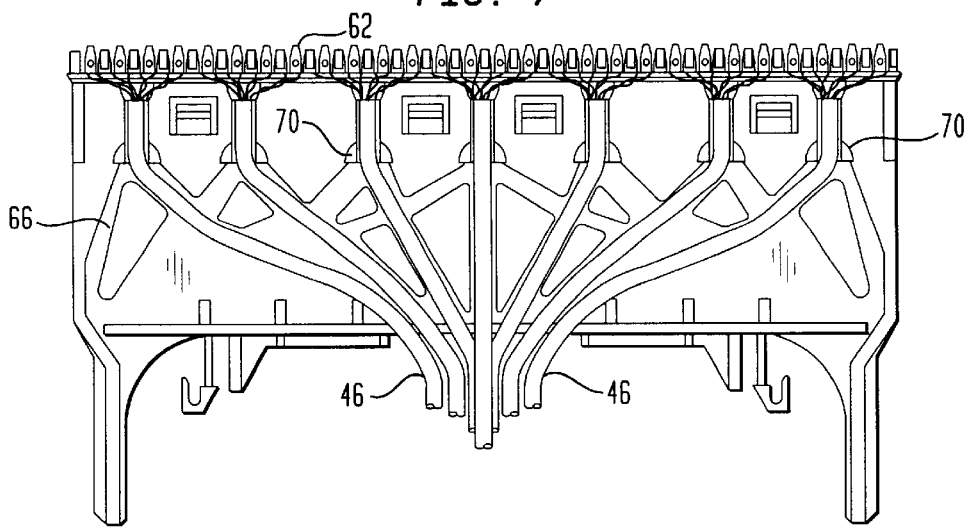
FIG. 7 is a front elevational view of the cable organizer of FIG. 4, showing a cable routing pattern.
Figure 8:
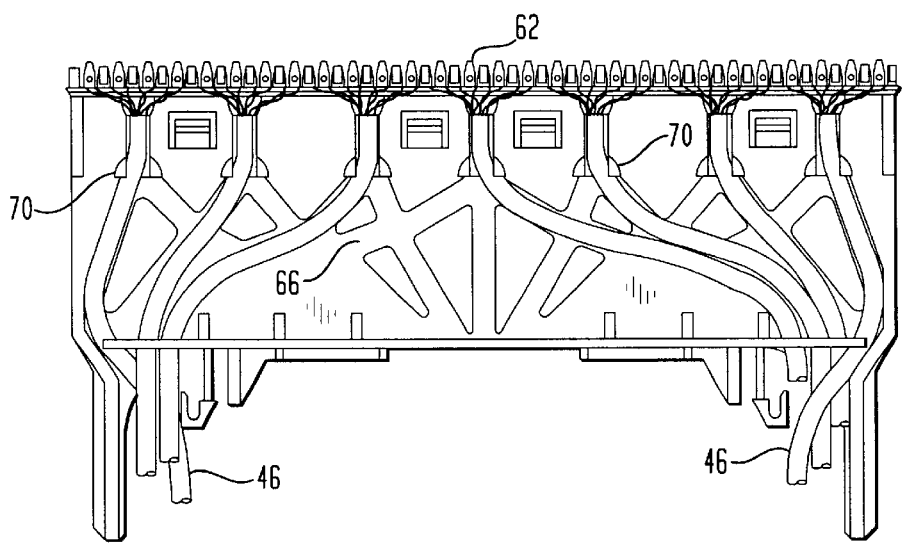
FIG. 8 is a front elevational view of the cable organizer of FIG. 4, showing another cable routing pattern.
Figure 9:
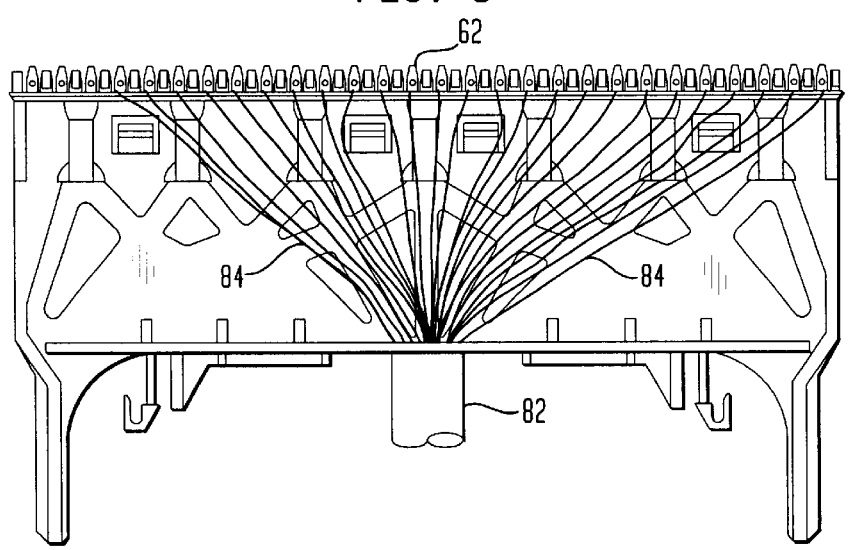
FIG. 9 is a front elevational view of the cable organizer of FIG. 4, showing yet another cable routing pattern.

Turning now to FIGS. 7, 8, and 9, as well as FIGS. 4, 5, and 6, the cable conductors 46 run along selected walls from the plate lower edge 56 to connect to the termination array 62. Two possible routing patterns for four-pair conductor cables 46 are shown in FIGS. 7 and 8. The hooks 70 serve to hold the cable conductors 46 in the channels 66. Cable conductors 86 are sheathed to within about one half inch of the termination array 62. The sheathing helps to organize the cable conductors 86, reduce cross-talk, and improve electrical performance. The cable conductors 86 are then connected to the conductor termination array 62 in the standard manner. FIG. 9 illustrates a twenty-five pair conductor cable 82, wherein sheathing ends at the shelf, and conductor pairs 84 are routed to the array 62.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A cable organizer, for use in connection with cable conductors, the cable organizer comprising:

a plate, the plate having front and rear surfaces extending between opposite upper and lower edges, and between first and second ends;

a conductor termination array mounted on the plate upper edge; and directing means for directing the cable conductors across the plate front surface toward the termination array; wherein said directing means further comprises a plurality of guide elements disposed transversely to the plate front surface, the guide elements defining channels for receiving the cable connectors;

wherein the cable conductors are directed substantially through a plane approximately parallel to the front surface, so that the cable conductors are sheathed across most of the front plate surface up to the termination array.

2. The cable organizer of claim 1, wherein the guide elements include a plurality of walls extending across the plate front surface.

3. The cable organizer of claim 1, wherein the guide elements include a plurality of hooks projecting outward from the plate front surface.

4. The cable organizer of claim 1, further comprising:

a shelf projecting outward from the plate lower edge to support wiring, the shelf having slots therethrough adjacent the plate front surface to pass the cable conductors through the shelf; and mounting means for releasably mounting and stabilizing the cable organizer on a support base.

5. A cable organizer, for use in connection with cable conductors, the cable organizer comprising:

a plate, the plate having front and rear surfaces extending between opposite upper and lower edges, and between first and second ends;

a conductor termination array mounted on the plate upper edge;

directing means for directing the cable conductors across the plate front surface toward the termination array;

a shelf projecting outward from the plate lower edge to support wiring, the shelf having slot therethrough adjacent the plate front surface to pass the cable conductors through the shelf;

mounting means for releasable mounting and stabilizing the cable organizer on a support base, said mounting means further comprising a least one arm attached to the plate lower edge and extending away therefrom, for insertion into the support base; and at least one latch attached to the plate lower edge for engagement with the support base;

wherein the cable conductors are directed substantially through a plane approximately parallel to the front surface, so that the cable conductors are sheathed across most of the front plate surface up to the termination array.

6. The cable organizer of claim 1, further comprising: retaining means for releasably retaining a cable cover on the cable organizer.

7. A cable organizer, for use in connection with a cable cover, cable conductors, and connecting blocks, the cable organizer comprising:

a plate, the plate having front and rear surfaces extending between opposite upper and lower edges, and between first and second ends;

a conductor termination array mounted on the plate upper edge and extending between the first and second ends;

a plurality of guide elements disposed transversely to the plate front surface, the guide elements defining channels for receiving and directing the cable conductors across the plate front surface toward the termination array;

a shelf projecting outward from the plate lower edge to support wiring, the shelf having slots therethrough adjacent the plate front surface to pass the cable conductors through the shelf;

mounting means for releasably mounting and stabilizing the cable organizer on a support base; and retaining means for releasably retaining the cable cover on the cable organizer;

wherein the cable conductors are directed substantially through a plain approximately parallel to the front plate surface, so that the cable conductors are sheathed across most of the front plate surface up to the termination array.

8. The cable organizer of claim 7, wherein the guide elements include a plurality of walls extending across the plate front surface for running the cable conductors from the plate lower edge to the termination array.

9. The cable organizer of claim 7, wherein the guide elements include a plurality of hooks projecting outward from the plate front surface and over the channels, for retaining the cable conductors.

10. The cable organizer of claim 7, wherein the mounting means further comprises:

at least one arm attached to the plate lower edge and extending away therefrom, for insertion into the support base; and at least one latch attached to the plate lower edge for engagement with the support base.

11. The cable organizer of claim 7, wherein the retaining means further comprises a resilient latch projecting outward from the plate for engaging a corresponding hole in the cable cover.

* * * * *